Dec. 26, 1933.  C. J. NOLL  1,941,152
CAN MACHINERY
Filed Dec. 16, 1931
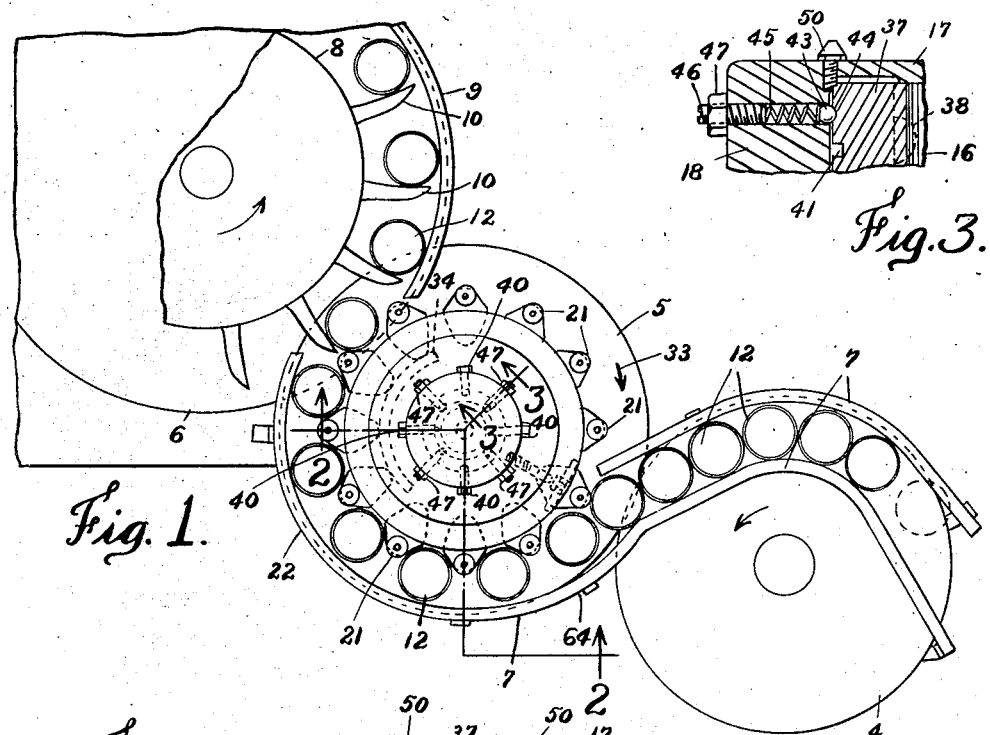
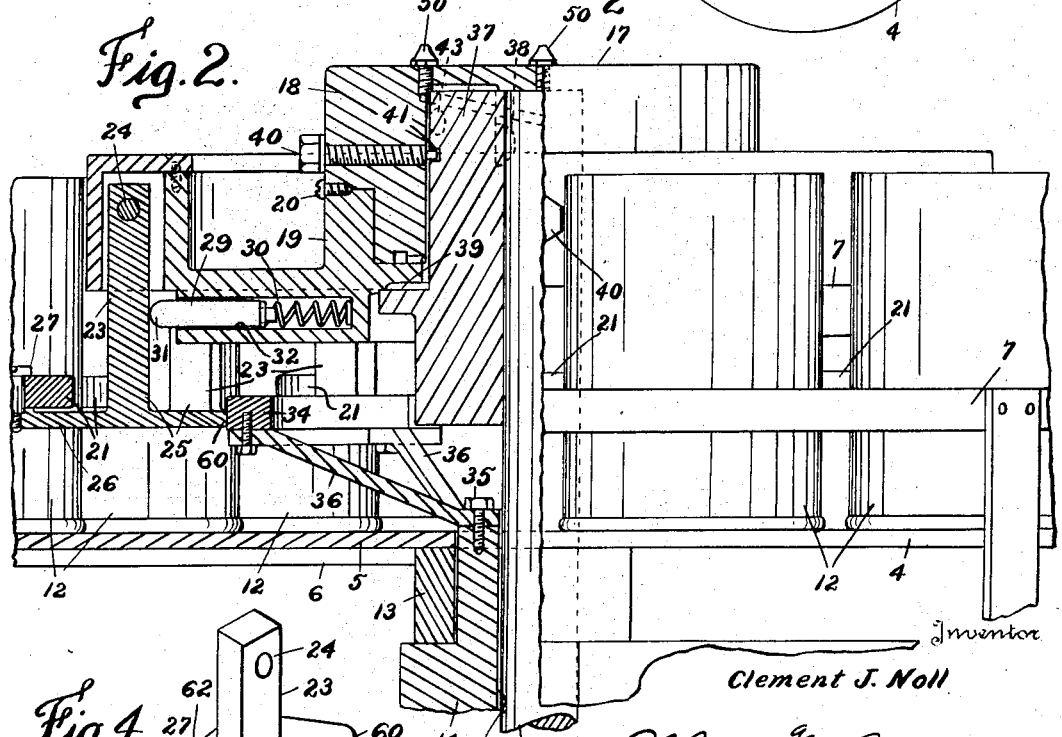
Inventor
Clement J. Noll
By Murray and Zugelter
Attorneys Patented Dec. 26, 1933

1,941,152

UNITED STATES PATENT OFFICE 1,941,152

CAN MACHINERY

Clement J. Noll, Norwood, Ohio, assignor, by direct and mesne assignments, of one-half to The Heekin Can Company, Cincinnati, Ohio, a corporation of Ohio, and one-half to Joseph Peyser, Mount Vernon, N. Y.

Application December 16, 1931
Serial No. 581,411

21 Claims. (Cl. 198—22)

This invention relates to can machinery and especially to that part thereof which functions to uniformly space a series of moving cans or containers prior to reception by other mechanisms which require a uniform feed of cans or containers.

An object of the invention is to provide a quick-acting substantially frictionless container spacer which is smooth and non-spilling in its operation.

Another object is to provide a container spacer of the above stated character which cannot jam and injure the containers during the spacing operation.

A further object is to provide a device of the character referred to above, which is reliable and effective in its action.

These and other objects are attained by the means described herein and disclosed in the accompanying drawing, in which:

Fig. 1 is a fragmental top plan view of a machine embodying the invention.

Fig. 2 is an enlarged cross-sectional view taken on line 2—2 of Fig. 1.

Fig. 3 is an enlarged cross-sectional view taken on line 3—3 of Fig. 1.

Fig. 4 illustrates a combination can spacer and pusher.

In the feeding of cans or containers to the various mechanisms which cap or otherwise operate upon them, it is desirable, and in many instances necessary, to present the containers to said mechanisms in a uniformly spaced condition. Various spacing mechanisms have been devised for use in can feeding machinery, but practically all of them are found to fail in functioning reliably and effectively without spilling the contents of the cans. By means of the following described can spacer and feeder, the cans are spaced and advanced gently with increased accuracy and certainty, and without injuriously striking and cramping the cans, and spilling the contents.

In the drawing, 4, 5 and 6 indicate rotating can supporting tables, that indicated at 5 being the can spacer table. Table 4 functions to feed cans 12 to the spacer table, and table 6 carries the cans from table 5 after spacing of the cans on the spacer table. Table 4 is provided with suitable can guides 7, and table 6 includes the can guides 8 and 9 and can moving means preferably in the form of extending arms 10 which move at a predetermined speed and serve to maintain the spaced relation of the cans. Table 4 slightly overhangs the table 5 and table 5 overhangs the table 6, as indicated in Fig. 1. The tables are rotated at proper relative speeds by means of any suitable power means not shown, in a manner well known to those skilled in the art to which the invention appertains.

The table 5 may have a hub 13 rotatably supported by the immovable standard 14 which forms a part of the can machine frame, and rotatably mounted within the bore 15 of the standard is a main shaft 16 which extends vertically above the frame and serves to support the spacer head, which is indicated generally by the character 17. The spacer head may comprise the annular cap portion 18 and the ring portion 19 which may be fixed together by any suitable means such as a screw or the like 20 to render the parts movable with the shaft 16. At spaced intervals about the periphery of the spacer head are disposed a plurality of freely rotatable rollers 21 which are spring urged outwardly for contacting the cans and initiating spacing thereof along the arcuate guide 22 which extends along a portion of the periphery of the rotatable plate 5. Although any suitable means may be provided for outwardly urging the rollers 21, there is illustrated and described herein a lever 23 pivoted at one end upon the spacer head at 24, the opposite end thereof being provided with a fixed plate or pusher element 26 upon which the roller 21 is rotatably mounted. Any suitable means such as a screw 27 or the like may be employed for maintaining the roller in position upon the fixed plate. A suitable plunger 29 extending radially of the head and urged constantly outwardly by means of a spring 30, may have its end 31 abutting the lever 23 intermediate the end 25 and the pivot 24, to constantly urge the lower or plate end of the lever outwardly toward the cans 12. The plunger and spring 30 may be received in a radial bore 32 provided in the rotating spacer head. From the foregoing it should readily be apparent that cans 12 fed by the table 4 will be contacted by the spring urged rollers 21 and automatically spaced as the head rotates in a clockwise direction as indicated by the arrow 33 of Fig. 1. Since the cans fed between the guides 7 ordinarily are not spaced before reaching the spacer table 5, there is naturally some congestion apparent at the point where the cans leave table 4 and place themselves on the spacer table 5, but by the time the spacer table and the rotating head 17 move through a small part of a circle arc, the cans adjust themselves to assume positions in contact with the adjacent plates 26 and in abutment upon the guide 22.

An important feature of the invention is the shape of the combination can spacer and pusher element 26. The element 26 is fixed relative the stem or lever 23 and preferably is at right angles thereto. Said element has a heel portion 60 which is adapted to ride upon the arcuate abutment or stop 34, and directly opposite the heel portion is the roller 21 and its mounting shaft or stud 27. The forward end 61 of member 26 is located slightly inwardly relative the periphery of the roller 21 so that the cans will contact the roller rather than the end 61. From the forward end 61, the sides or edges 62 and 63 diverge outwardly so as to define an angle approximating 60 degrees in extent, and these sides or edges perform as pushing surfaces for the cans after the cans are initially urged into spaced relationship by the rollers. From the foregoing it should readily be understood that the rollers 21 first act upon the cans, as the cans enter the spacing mechanism, to initially urge the cans to a spaced condition, and that thereafter the inclined sides 63 of the pusher elements contact the cans and move them along to the can discharge point of the spacing device. The angularity of the sides 62 and 63 is such that the component of forces normally acting upon the member 26 to depress the plunger 29, is practically nil. The rollers 21 do not, in the preferred construction, assist in the forwarding of the cans after the spacing has been effected. As a result of the foregoing described construction, there is eliminated all tendency of the cans to crowd and to depress the element 26, once the cans are spaced.

That portion 64, of the outermost guide 7, which is adjacent to the can receiving location of the spacer device 5, is curved on a larger circle arc than that of the remainder of the guide shown at 22, in order to provide a gradually constricting guideway at said receiving location, or mouth, of the spacing device. By this means, the cans are very gently moved and operated upon as they are gradually subjected to the influence of the spacer device, the gentle handling being necessary due to the fact that the cans may contain liquid or semi-liquid foodstuffs while being spaced.

At 34 is indicated a stationary arcuate abutment or stop which may assist in precluding inward yielding of the rollers 21 after the proper can spacing has been afforded by reason of the resiliency of the roller mountings in the region of the can receiving location of the spacing device. The purpose of the stationary stop is to provide a rigid backing for the plates 26 so as to preclude displacement of the spaced cans as the fingers 10 associated with table 6 engage the spaced cans and remove them from the spacer table. The stop or abutment 34 may be mounted upon any stationary part of the machine, such as the standard 14, by means of bolts or other securing means 35. As indicated in Fig. 2 the stop may be supported in position by reason of its mounting upon a series of radially extending arms 36 which are secured at their inner ends to the standard 14.

As stated in a previous paragraph, the spacer head 17 normally rotates bodily with the shaft 16; however, in order to preclude jamming of the cans in the spacing device, and possible breakage of parts in the event that the wrong size or shape of can or some other object finds its way into the spacing device, there is provided a means whereby excessive resistance to rotation of the spacer head effects a stalling of the spacer head notwithstanding continued rotation of the main shaft 16. Said means may comprise a sleeve 37 keyed or otherwise secured to the main shaft 16, as at 38, and having a shoulder 39 upon which may rest the ring or roller support 19. The cap 18 to which the ring 19 is fixed, may be provided with one or more radially extending screws 40, or equivalent means, for reception in a smooth annular groove 41 provided in the sleeve 37 and arranged to preclude shifting of the sleeve and the ring 19 longitudinally of the main shaft 16, while permitting them to rotate relative the shaft. One or more friction or slipping clutch means (see Fig. 3) normally affords a yielding connection between the members 18 and 37, and said clutch may conveniently consist of a ball 43 constantly urged by a spring 45, into a depression 44 formed in the member 37. The force of the spring may be varied by means of the screw 46 which may be locked in adjusted positions by means of the lock nut 47. It should readily be evident from the foregoing, that excessive resistance opposing rotation of the spacer head will cause the clutch 43 to slip or disengage and thereby permit rotation of main shaft 16 independently of the spacer head, which head will then remain stationary and preclude injury to the machine and to the cans so long as the excessive resistance opposes rotation of the spacer head. After removal of the obstruction causing the resistance, the machine is rendered free to operate in a normal manner.

The character 50 indicates grease fittings for lubrication of the moving parts.

It is to be understood that the rollers 21 may have movable mountings other than those illustrated in the drawing hereof, and that the stop 34 may be supported by any stationary part. The clutch means indicated in Fig. 3 is but one of a number of clutch means suitable for effecting the yielding driving connection desired. The foregoing and other modifications and changes in structural details of the device may be made, within the scope of the claims, without departing from the spirit of the invention.

What is claimed is:

1. In combination in container handling machinery, a container spacing means comprising a table onto which containers are fed and from which the containers are removed in uniformly spaced relationship, means comprising rotatable yieldingly mounted rollers for spacing the containers and means for rendering substantially rigid some of the yielding mountings of the rollers.

2. In combination in container handling machinery, a table onto which containers are fed and from which the containers are removed in uniformly spaced relationship, a rotatable spacer head and a cooperative guide means associated with the table, a series of spaced rotatable rollers supported by the spacer head, means for yieldingly urging the rollers toward the guide means and into contacting relationship with containers fed between the guide means and the spacer head and means for rendering the yielding means inoperative during removal of the spaced containers from the supporting table.

3. In combination in container handling machinery, a table onto which containers are fed and from which the containers are removed in uniformly spaced relationship, a rotatable spacer head and a cooperative guide means associated with the table, a series of spaced rotatable rollers supported by the spacer head, means for yieldingly urging the rollers toward the guide means and into contacting relationship with containers fed between the guide means and the spacer head, a drive shaft normally in driving relationship with the spacer head, and means for terminating the driving relationship upon application thereto of excessive resistance opposing rotational movement of the driving head.

4. In combination in container handling machinery, a table onto which containers are fed and from which the containers are removed in uniformly spaced relationship, a rotatable spacer head and a cooperative guide means associated with the table, a series of spaced rotatable rollers supported by the spacer head, means for yieldingly urging the rollers toward the guide means and into contacting relationship with containers fed between the guide means and the spacer head and means for rendering the yielding means inoperative during removal of the spaced containers from the supporting table, a drive shaft normally in driving relationship with the spacer head, and means for terminating the driving relationship upon application thereto of excessive resistance opposing rotational movement of the driving head.

5. In combination in container handling machinery a table onto which containers are fed and from which the containers are removed in uniformly spaced relationship, a rotatable spacer head and a cooperative guide means associated with the table, a series of spaced rotatable rollers supported by the spacer head and having their axes disposed in a substantially perpendicular position relative to the table, the rollers being of a small size and relative spacing such that only one container may be received between adjacent rollers and the guide means, and means for yieldingly urging the rollers toward the guide means.

6. In combination in container handling machinery a table onto which containers are fed and from which the containers are removed in uniformly spaced relationship, a rotatable spacer head and a cooperative guide means associated with the table, a series of spaced rotatable rollers supported by the spacer head and having their axes disposed in a substantially perpendicular position relative to the table, the rollers being of a small size and relative spacing such that only one container may be received between adjacent rollers and the guide means, means for yieldingly urging the rollers toward the guide means, and means for rendering inoperative the yielding means during removal of the containers from the table.

7. In combination in container handling machinery, a container spacing means comprising a table onto which containers are fed and from which the containers are removed in uniformly spaced relationship, and means comprising rotatable rollers for spacing the containers and pusher elements located adjacent the rollers for contacting and advancing the containers after spacing of the containers by the roller means.

8. In combination in container handling machinery, a container spacing means comprising a table onto which containers are fed and from which the containers are removed in uniformly spaced relationship, and means comprising rotatable yieldingly mounted rollers for spacing the containers and yieldable pusher elements located adjacent the rollers for contacting and advancing the containers after spacing of the containers by the roller means.

9. In combination in container handling machinery, a container spacing means comprising a table onto which containers are fed and from which the containers are removed in uniformly spaced relationship, and means comprising rotatable yieldingly mounted rollers for spacing the containers and yieldable pusher elements comprising divergent walls for contacting and maintaining the containers in spaced relationship and advancing the containers after spacing of the containers by the roller means.

10. In combination in container handling machinery, a container spacing means comprising a table onto which containers are fed and from which the containers are removed in uniformly spaced relationship, and means comprising rotatable rollers for spacing the containers and pusher elements located adjacent the rollers for contacting and advancing the containers after spacing of the containers by the roller means, the rollers being mounted directly upon the pusher elements and extending slightly outward beyond them.

11. A device for separating bodies including: a movable support to advance the bodies; a guide adjacent said support at one side of the bodies; a plurality of rotatable rollers, having a movement of translation in the same direction as the movement of said support and capable of an outward and inward movement toward and away from the bodies, adjacent said support on the other side of the bodies; and yielding means to urge said rollers individually and to the full extent of their outward movement toward the bodies and thereby the latter toward the guide.

12. A device for separating bodies including: a rotatable dial to advance the bodies; a guide adjacent the outer circumference of said dial; a plurality of rotatable rollers, having a movement of translation in the same direction as the movement of the dial and capable of an outward and inward movement toward and away from the bodies, in spaced relation to the guide to engage the bodies and hold them against the guide; and yielding means to urge said rollers individually and to the full extent of their outward movement toward the bodies.

13. In combination in container handling machinery, a table onto which cylindrical containers are fed and from which the containers are removed in uniformly spaced relationship, a rotatable spacer head and a cooperative guide means associated with the table, a series of spaced rotatable rollers, mounting means carrying the rollers and supported by the spacer head, the rollers having their axes disposed in a substantially perpendicular position relative to the table, said rollers being of a small diameter such that the rollers may be extended considerably between containers without widely spacing the containers apart, and yielding means arranged to urge the rollers outwardly of the head and between the containers.

14. In combination in container handling machinery, a table onto which cylindrical containers are fed and from which the containers are removed in uniformly spaced relationship, a rotatable spacer head and a cooperative guide means associated with the table, a series of spaced rotatable rollers, mounting means carrying the rollers and supported by the spacer head, the rollers having their axes disposed in a substantially perpendicular position relative to the table, said rollers being of a small diameter such that the rollers may be extended considerably between containers without widely spacing the containers apart, yielding means arranged to urge the rollers outwardly of the head and between the containers, and means for rendering inoperative the yielding means during the removal of the containers from the table.

15. In combination in container handling machinery, a table onto which cylindrical containers are fed and from which the containers are removed in uniformly spaced relationship, a rotatable spacer head and a cooperative guide means associated with the table, a series of spaced rotatable rollers, mounting means carrying the rollers in advance thereof and supported by the spacer head, the rollers having their axes disposed in a substantially perpendicular position relative to the table, said rollers being of a small diameter such that the rollers may be extended considerably between containers without widely spacing the containers apart, the amount of extension being sufficient to permit abutment of the roller mounting means upon the side walls of the containers, and yielding means arranged to urge the rollers outwardly of the head and to a position well within the space between adjacent containers, for reducing friction between the guide means and the container.

16. In combination in container handling machinery, a table onto which containers are fed and from which the containers pass in uniformly spaced relationship, a rotatable spacer head and a co-operative guide means associated with the table, a series of spaced rotatable rollers supported by the spacer head, means for yieldingly urging the rollers toward the guide means and into contacting relationship with containers fed between the guide means and the spacer head, the movement of the containers, spacer head and rollers tending to so move the rollers as to retract the yielding means operative upon the rollers, and means for limiting the retraction of said yielding means.

17. In combination in container handling machinery, a table onto which containers are fed and from which the containers pass in uniformly spaced relationship, a rotatable spacer head and a co-operative guide means associated with the table and providing a passageway for containers, a series of spaced rotatable rollers supported by the spacer head and extending into said passageway, means for yieldingly urging the rollers toward the guide means and into contacting relationship with containers fed between the guide means and the spacer head, the movement of the containers, spacer head and rollers tending to so move the rollers as to retract the yielding means, and means for limiting the retraction of said yielding means.

18. In combination in container handling machinery, a table onto which containers are fed and from which the containers are removed in uniformly spaced relationship, a rotatable spacer head and a co-operative guide means associated with the table, a series of spaced rotatable rollers supported by the spacer head and having their axes disposed in a substantially perpendicular position relative to the table, the rollers being of a small size and relative spacing such that each roller projects substantially wholly between two adjacent containers, whereby only one container may be received between adjacent rollers and the guide means, and means for yieldingly urging the rollers toward the guide means.

19. In combination in container handling machinery, a table onto which containers are fed and from which the containers are removed in uniformly spaced relationship, a rotatable spacer head and a co-operative guide means associated with the table, a series of spaced rotatable rollers supported by the spacer head and having their axes disposed in a substantially perpendicular position relative to the table, the rollers being of a small size and relative spacing such that each roller projects substantially wholly between two adjacent containers, whereby only one container may be received between adjacent rollers and the guide means, means for yieldingly urging the rollers toward the guide means, and means for rendering inoperative the yielding means during removal of the containers from the table.

20. In combination in container handling machinery a table onto which containers are fed and from which the containers are removed in uniformly spaced relationship, a rotatable spacer head and a cooperative guide means associated with the table, a series of spaced rotatable rollers supported by the spacer head and having their axes disposed in a substantially perpendicular position relative to the table, the rollers being of a small size and relative spacing such that only one container may be received between adjacent rollers and the guide means, and means for yieldingly urging the rollers toward the guide means, the diameter of each roller being approximately equal to the radius of the containers handled by the machine.

21. In combination in container handling machinery a table onto which containers are fed and from which the containers are removed in uniformly spaced relationship, a rotatable spacer head and a cooperative guide means associated with the table, a series of spaced rotatable rollers supported by the spacer head and having their axes disposed in a substantially perpendicular position relative to the table, the rollers being of a small size and relative spacing such that only one container may be received between adjacent rollers and the guide means, means for yieldingly urging the rollers toward the guide means, the diameter of each roller being approximately equal to the radius of the containers handled by the machine, and means for rendering inoperative the yielding means during removal of the containers from the table.

CLEMENT J. NOLL.